United States Patent
Fotev et al.

(10) Patent No.: US 11,946,497 B2
(45) Date of Patent: Apr. 2, 2024

(54) METHOD, SYSTEM AND APPARATUS FOR REDUCING FLUID DRAG

(71) Applicant: 13 Mari Ltd., Kearny, NJ (US)

(72) Inventors: Krassimir Fotev, Kearny, NJ (US); Rumen Kishev, Varna (BG); Grigor Plamenov Nikolov, Varna (BG)

(73) Assignee: 13 MARI LTD., Kearny, NJ (US)

( * ) Notice: Subject to any disclaimer, the term of this patent is extended or adjusted under 35 U.S.C. 154(b) by 288 days.

(21) Appl. No.: 17/461,510

(22) Filed: Aug. 30, 2021

(65) Prior Publication Data

US 2021/0388858 A1    Dec. 16, 2021

Related U.S. Application Data

(63) Continuation of application No. PCT/US2019/047066, filed on Aug. 19, 2019.
(Continued)

(51) Int. Cl.
*F15D 1/00* (2006.01)
*B62D 35/00* (2006.01)
(Continued)

(52) U.S. Cl.
CPC ............. *F15D 1/003* (2013.01); *B62D 35/00* (2013.01); *B63B 1/36* (2013.01); *B64C 21/02* (2013.01);
(Continued)

(58) Field of Classification Search
CPC . F15D 1/003; F15D 1/004; F15D 1/12; B62D 35/00; B63B 1/36; B64C 21/02;
(Continued)

(56) References Cited

U.S. PATENT DOCUMENTS

| 2,800,291 A | * | 7/1957 | Stephens ................. B64C 23/06 |
| | | | 114/67 R |
| 4,720,239 A | | 1/1988 | Owczarek |
| | | | (Continued) |

FOREIGN PATENT DOCUMENTS

| DE | 20 2011 106 216 U1 | 3/2012 |
| EP | 0 543 647 B1 | 1/1998 |
| | (Continued) | |

OTHER PUBLICATIONS

International Search Report of International Searching Authority issued by Russian Federal Institute of Industrial Property for corresponding International Patent Application No. PCT/US2019/047066, dated Jun. 11, 2020.
(Continued)

*Primary Examiner* — Minh Q Le
(74) *Attorney, Agent, or Firm* — Myers Wolin, LLC

(57) ABSTRACT

A novel mechanism for reducing boundary layer friction and inhibiting the effects of uncontrolled fluid turbulence and turbulent layer separation, thus reducing the body drag, kinetic energy losses and lowering engine and pump fuel consumption is proposed. It steps on the type of turbulence observed in the so-called in fluid dynamics "drag crisis". Plurality of device shapes and plurality of devices producing the wanted pure form of even plurality of counter-rotating vortices extending into the flow, i.e. tubes, are presented and discussed in detail, contrasting with the prior art. Configurations of multiple devices for the purposes of drag and fuel reduction, including their simulations and experimental results are put forward. Additional embodiments of the resulting tubes disclose use on aircraft or vessel control surfaces as stall inhibitors, use in wind turbines as dynamic range extenders, as well as use in turbines in efficient cooling mechanisms.

16 Claims, 16 Drawing Sheets

Related U.S. Application Data

(60) Provisional application No. 62/822,369, filed on Mar. 22, 2019, provisional application No. 62/721,191, filed on Aug. 22, 2018.

(51) Int. Cl.
| | |
|---|---|
| *B63B 1/36* | (2006.01) |
| *B64C 21/02* | (2006.01) |
| *F15D 1/12* | (2006.01) |
| *F04D 29/68* | (2006.01) |

(52) U.S. Cl.
CPC .............. *F15D 1/004* (2013.01); *F15D 1/12* (2013.01); *F04D 29/681* (2013.01); *F04D 29/688* (2013.01); *F05D 2240/127* (2013.01); *F05D 2260/2212* (2013.01); *Y02T 50/10* (2013.01); *Y02T 50/60* (2013.01)

(58) Field of Classification Search
CPC . B64C 3/14; B64C 2003/148; B64C 2230/28; Y02T 50/10; Y02T 50/60; F04D 29/681; F04D 29/688; F05D 2240/127; F05D 2260/2212
USPC ............................................................ 137/1
See application file for complete search history.

(56) References Cited

U.S. PATENT DOCUMENTS

| | | | | |
|---|---|---|---|---|
| 4,759,516 A | * | 7/1988 | Grose ...................... | F15D 1/06 244/130 |
| 5,361,828 A | * | 11/1994 | Lee ......................... | F01D 5/187 165/109.1 |
| 5,481,996 A | * | 1/1996 | Osawa ..................... | B63B 1/20 114/67 R |
| 5,797,414 A | * | 8/1998 | Sirovich ................. | F15D 1/003 137/833 |
| 7,699,583 B2 | * | 4/2010 | Cunha ..................... | F01D 5/188 415/115 |
| 8,881,500 B2 | * | 11/2014 | Gutmark ................. | F23R 3/16 60/39.38 |
| 9,958,215 B2 | * | 5/2018 | Buckrell ................. | F28F 1/128 |
| 2010/0187361 A1 | * | 7/2010 | Rawlings .............. | F15D 1/0035 428/141 |
| 2011/0186685 A1 | | 8/2011 | Tsotsis et al. | |
| 2011/0315248 A1 | * | 12/2011 | Simpson ................. | F15D 1/003 137/561 R |
| 2015/0329200 A1 | * | 11/2015 | Barrett ................. | G03G 13/283 244/200.1 |
| 2016/0194076 A1 | * | 7/2016 | Van Merksteijn ...... | B64C 21/10 428/156 |
| 2017/0234134 A1 | * | 8/2017 | Bunker ................... | F01D 5/145 415/208.2 |
| 2018/0162521 A1 | * | 6/2018 | Langenbacher .......... | F15D 1/12 |
| 2018/0298762 A1 | * | 10/2018 | Shelman-Cohen ... | F04D 29/681 |

FOREIGN PATENT DOCUMENTS

| | | |
|---|---|---|
| RU | 2 313 680 C2 | 12/2007 |
| SU | 1086246 A | 4/1984 |

OTHER PUBLICATIONS

Written Opinion of International Searching Authority issued by Russian Federal Institute of Industrial Property for corresponding International Patent Application No. PCT/US2019/047066, dated Jun. 11, 2020.

* cited by examiner

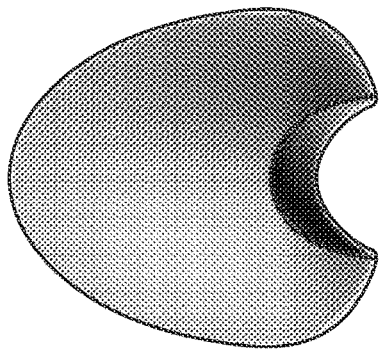
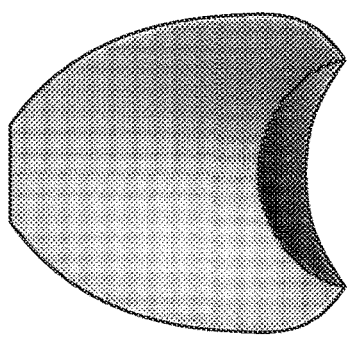
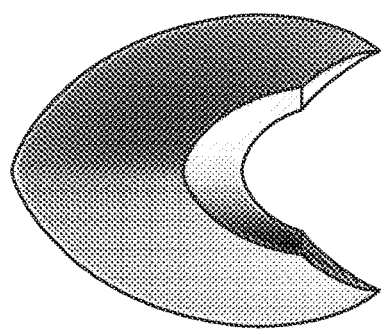
*FIG. 4A*     *FIG. 4B*     *FIG. 4C*
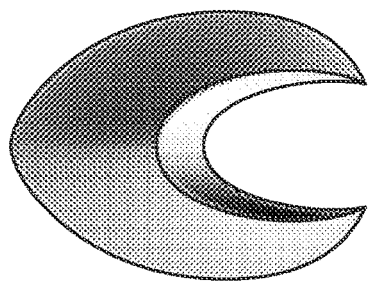
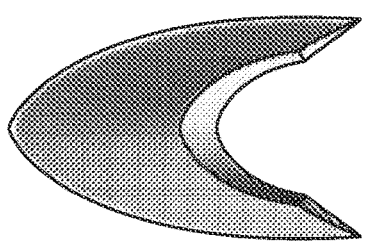
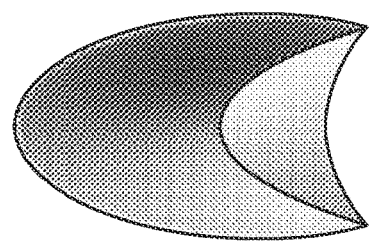
*FIG. 4D*     *FIG. 4E*     *FIG. 4F*
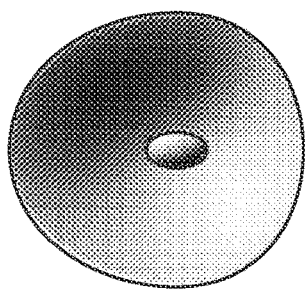
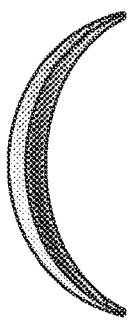
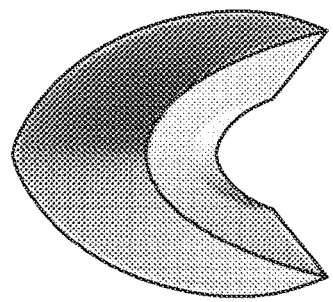
*FIG. 4G*     *FIG. 4H*     *FIG. 4I*

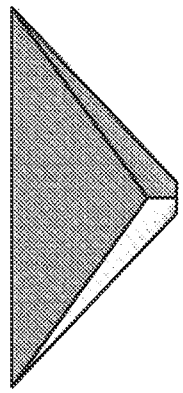
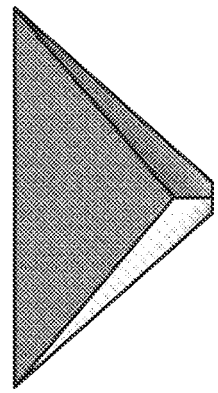
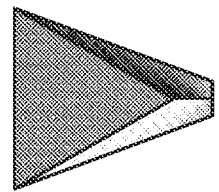
FIG. 5A            FIG. 5B            FIG. 5C
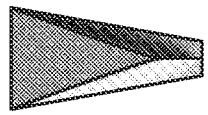
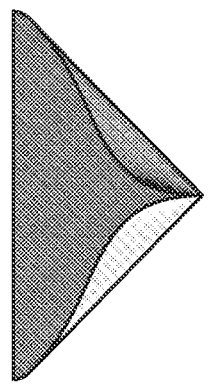
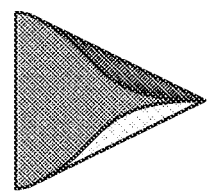
FIG. 5D            FIG. 5E            FIG. 5F
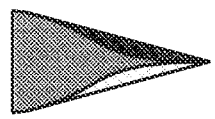
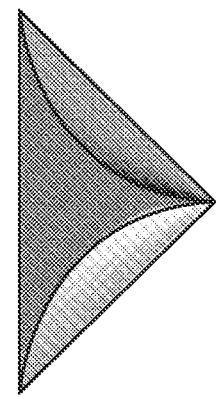
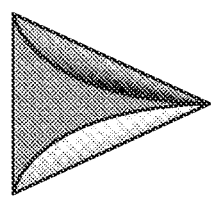
FIG. 5G            FIG. 5H            FIG. 5I

| Angle of attack [degrees] | CL mean no dunes | CL mean with dunes | Difference % |
|---|---|---|---|
| 18 | 0.3 | 0.315 | 4.87 |
| 24 | 0.4585 | 0.451 | -1.64 |
| 26 | 0.4837 | 0.4896 | -1.21 |

FIG. 15

| Angle of attack [degrees] | CD mean no dunes | CD mean with dunes | Difference % |
|---|---|---|---|
| 18 | 0.075 | 0.0777 | 3.53 |
| 24 | 0.1515 | 0.1468 | -3.15 |
| 26 | 0.1716 | 0.1714 | - |

FIG. 16

METHOD, SYSTEM AND APPARATUS FOR REDUCING FLUID DRAG

CROSS-REFERENCE TO RELATED APPLICATION

This is a continuation application under 35 U.S.C. § 120 of International Application PCT/US2019/047066, filed Aug. 19, 2019, which claims the benefit of U.S. Provisional Patent Application Nos. 62/721,191, filed Aug. 22, 2018, and 62/822,369, filed Mar. 22, 2019, the contents of each of which are incorporated by reference herein in their entirety.

FIELD OF THE INVENTION

One embodiment of the present invention relates generally to systems wherein a fluid, i.e. air, gas, various liquids like water, oil, liquid metal or chemical compounds, etc., flows along the surface of a body. It relates particularly to, in one embodiment, a method for reducing boundary layer friction and inhibiting the effects of uncontrolled liquid turbulence and turbulent layer separation, thus reducing the body drag, kinetic energy losses and lowering engine and pump fuel consumption. In other embodiment, enhanced heat transfer method is provided, utilizing the specific type of turbulence with minimal separation for use in turbine blade cooling, thus increasing the turbine inlet temperature and overall efficiency. In yet another embodiment, stall of wings and control surfaces is delayed, increasing the agility of marine vessels and aircrafts and lowering fuel consumption via the observed reduced drag.

BACKGROUND

Moving through a fluid, a body experiences drag due to the internal fluid friction in the layers attached to and in the vicinity of the body surface, also known as a boundary layer. Typically, the drag increases as the boundary layer switches from laminar to turbulent flow regime, known as a wake. The born turbulent vortices do not necessarily follow the body surface. Due to vortex-body surface separation and diversion, energy is carried away from the boundary layer, forcing the body to reenergize it in order to maintain speed. This process increases the overall drag and energy consumption of the engine, propelling the craft though the fluid.

To reduce drag, one must keep the boundary layer energized, while delaying or inhibiting the separation. Note the previous statement makes no reference to turbulence wake—many of the drag reduction mechanisms do rely on the wake for an efficient drag reduction. The following non-limiting examples of techniques borrowed from the marine world assist in maintaining an energetic boundary layer during the body motion (Fish, F E, Lauder, G V. 2006. Passive and Active Flow Control by Swimming Fishes and Mammals. Annual Review of Fluid Mechanics. 2006 38:1, 193-224):

heating the body surface to reduce the boundary layer viscosity, i.e. friction and kinetic energy losses (patents JP3616816B2, hybrid technology);

vibrating the body surface to effectively "heat" the boundary layer, affecting effective viscosity and friction (patent JP2006298088A);

introduction of gas bubbles, even cavitation sustained long enough for the body to flow through it, are yet another example of effective viscosity reduction (U.S. Pat. No. 7,874,258B2, JP4286313B1, CN106956746A; Supercavitation, https://en.wikipedia.org/wiki/Supercavitating_torpedo);

small-scale, sub millimeter in case of water, oil, air riblets, like the one found on the shark skin, induce small vortices reducing effective viscosity close to the body with minimal separation and energy dissipation (patents US20110186685A1, US20170081021A1, JP2010023631A; US20100330340A1 a hybrid technology; Bechert D W, Hage W. 2006. Drag reduction with riblets in nature and engineering. In: Flow Phenomena in Nature Volume 2: Inspiration, Learning and Application Design and Nature Vol 8, Vol 2. Wit Press. ISBN 1-84564-095-0);

large-scale tubercles on the leading edge of whale fins do help keep the induced turbulent layer attached to the fin, improving stall characteristics (patent KR20100048540A, US20060060721A1, U.S. Pat. No. 6,431,498B1); and flexible skin, like the one found on dolphins can actively morph with and adjust the turbulent flow, keeping it local for energy benefits (patent U.S. Pat. No. 7,226,484B2).

While all the techniques mentioned do reduce drag, the practical implementations are dependent upon energy source, in case of body heating, artificial material properties, especially flexibility, in case of dolphin-like skins, special paint application techniques, in case of sub millimeter riblets (patent WO2018146030A1). Some prior art depict adding small golf ball like indentations on an airplane or marine vessel instead of keeping the surface smooth (Vida N, et al. 2003. EP1604122B1). While "deforming" the surface this way is known to promote wake and suppress big separation and as result big energy loss, the manufacturing and maintenance of surfaces like the one described comes at perhaps too big of an expense, making the technique not viable in a large scale.

Considerable prior art ties to land vehicles and trailers and includes and variety of "spoilers" and "spoiler" configurations. The spoilers do suppress big wake and control the separation at the rear end of the vehicle, but do little to manage the high frontal fluid pressure or reduce drag due to the sliding within the fluid side bounds of the vehicle, aircraft and marine vessel, the so-called wave drag included.

Further, in hydrodynamics, there is a drastic, two-fold or more reduction of drag observed on a body as the Reynolds number (Re) increases. This is known as drag crisis. It is important to recognize the reason for the drag crisis, mainly fluid self-organization in a particular, energy efficient type of turbulence with minimal amount of energy carried away by it. In the case of a ball, for instance, the reduced drag regime is due to capable of self-organization early wake as depicted on FIG. 1A. What simulations, which are difficult to carry at big Reynolds numbers, suggest is the appearance of four vortices behind the ball (Hoffman J. 2006. Simulation drag crisis for a sphere using skin friction boundary conditions. Proc. ECCOMAS CFD, 2006). The vortices extend longer distance behind the ball and appear as tubes. The rotation of vortices is synchronized, reducing friction at the tube boundaries as depicted on FIG. 1B. Further, the vortices are smaller in characteristic dimensions, compared to the ball diameter. All these observations suggest that small portion of the already, early awaken boundary layer energy is being carried away by the vortices. To correctly identify the tube-like structures in pure form, it is important to note the extending with the flow vortices do carry fine vortex "irregularities" arising from the speed difference at the boundary of the fluids moving with relative speeds (Brown G, Roshko A.

1974. On density effects and large structure in turbulent mixing layers. J. Fluid Mech. vol. 64, part 4, pp. 775-816), as depicted on FIG. 2.

However, such drag crisis has not been leveraged in vehicles, vessels, and aircrafts to reduce drag in an easily manufactured way.

New methods and devices are therefore required to inhibit vehicle, vessel and aircraft drag thus reducing fuel consumptions and transportation cost.

SUMMARY

One embodiment of the present invention provides a method and associated with it one or more devices designed to inhibit the fluid drag. The method provides a body surface-attached device, producing turbulence with minimal separation. In one embodiment, the turbulence produced is in the form of just touching, counter rotating vortices extending as tubes in the direction of the fluid flow. Plurality of device shapes and plurality of devices may be part of the drag reduction method. As the drag reduces, so do the kinetic energy losses of the body or fluid itself, in case of a fluid flowing through a pipe. The energy and fuel needed to maintain the body or fluid movement is reduced as well, thus reducing the overall vessel, vehicle, pump, or airplane operational cost.

Another embodiment of the present invention relies on the turbulence generated by the one or more surface-attached devices to provide a method for efficient heat exchange. The turbulence, in the form of just touching vortices, stays close to the surface and with limited separation. It further promotes downward, towards the surface fluid motion. Additional fluid "touching" the surface participates in the heat exchange. The cortices lead to enhanced mixing that "smooths" the temperature gradient. The promoted mixing, plus a big area covered by the stable, counter-rotating vortices, leads to an efficient heat exchange. The overall result is more efficient standalone convectional cooling or convectional cooling enhancing the effect of other turbine blade internal or film based cooling mechanisms. Cooler blades allow for higher turbine inlet temperatures. A 1% increase of the turbine inlet temperature allows for 2-3% increase of the mechanical energy output of the turbine, thus increasing the overall efficiency and decreasing operational costs of the turbine, solely as result of a better cooling method and apparatus.

Another embodiment of the present invention provides a method for improving stall characteristics of airplane wing, turbine or propeller blade, as well as vessel or craft control surfaces. The method provides a body surface-attached device, producing turbulence with minimal separation. The turbulence generated stays close to the surface and stabilizes the flow. In one embodiment, the one or more devices are attached on the leeward side of one or more wings, blades, vessel, airplane, or glider control surfaces. In embodiments, symmetrical, on both sides of a control surface arrangements may be needed. In one embodiment, the induced by the one or more devices just touching counter-rotating vortices stabilize the flow, thus reducing the size of the separation bubble manifesting the stall. Angle of attack and other flow characteristics the same, the devices reduce the surface device ensemble drag and associated with its energy needed to maintain the forward motion. In airplanes, helicopter blades and marine vessel propellers, this translates to less consumed fuel and lower operational cost. In wind turbines, vertical ones included, reduced stall does increase the turbine wind operational range, allowing for additional energy harvested with no turbine rotation deceleration and no structural integrity concerns. Equally important, the agility of the craft or vessel is improved, allowing for larger, controllable by the operator dynamic range of craft relative to fluid configurations.

BRIEF DESCRIPTION OF THE DRAWINGS

In the drawings, closely related figures have the same number but different alphabetic suffixes.

FIGS. 4A-4I depict a family of device elements based on a barchan dune model. The simulation and experimental results data discussed in the detailed description section relate to the top left device element.

FIGS. 5A-5I depict a family of device elements based on a wedge model. The simulations and experimental results data discussed in the detailed description section relate to the top left device element.

FIG. 15 depicts the measured mean over time lift coefficient (CL) for the NACA 0035 simulation setups.

FIG. 16 depicts the measured mean over time drag coefficient for the various NACA 0035 simulation setups.

DETAILED DESCRIPTION OF THE EMBODIMENTS

Figure 1A:
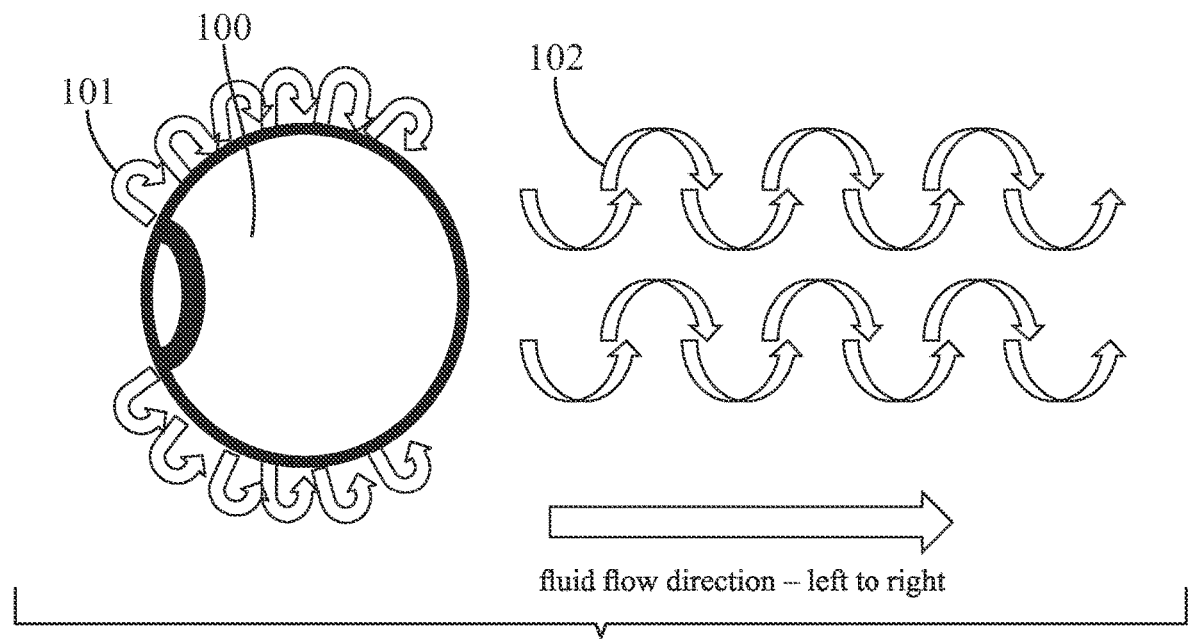
FIG. 1A depicts one embodiment of drag crisis in case of a ball moving through fluid within big Reynolds number regime seen laterally in relation to the fluid flow.
Figure 1B:
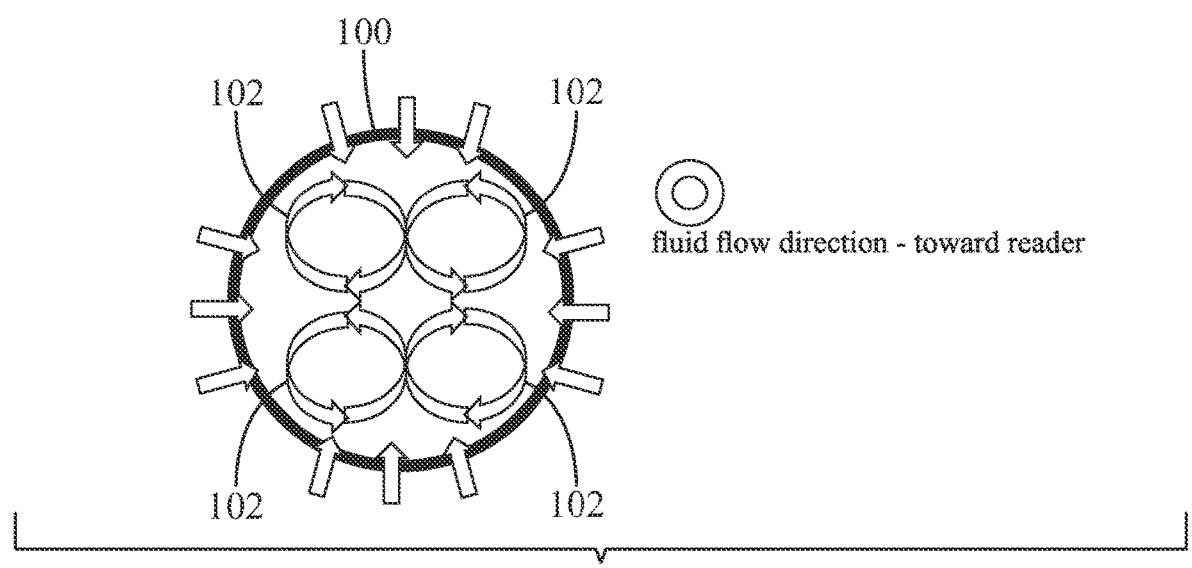
FIG. 1B depicts one embodiment of drag crisis in case of a ball moving through fluid within big Reynolds number regime seen perpendicularly to the fluid flow.
Figure 2A:
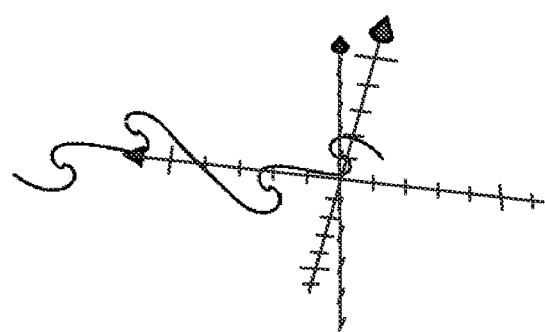
FIGS. 2A-2H depict sample fine flow line structures in a counter rotating vortex extending with the flow, i.e. most "irregular" flow lines in a tube. Simple cartoons of an actual 3D flow are given as 2D projections, to highlight the regularly expected fine structures, as observed in wind tunnel and simulations.
Figure 2B:
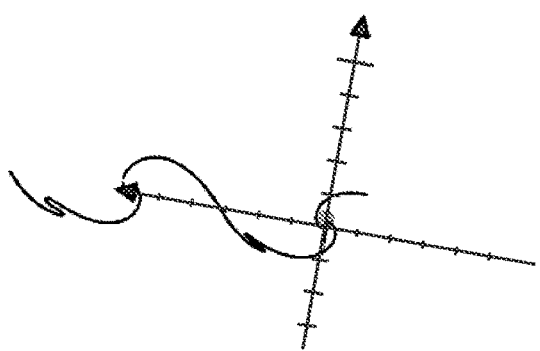
Figure 2C:
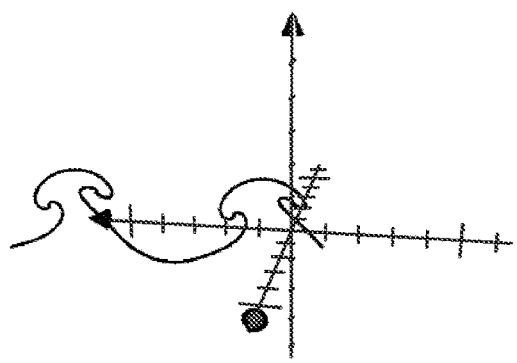
Figure 2D:
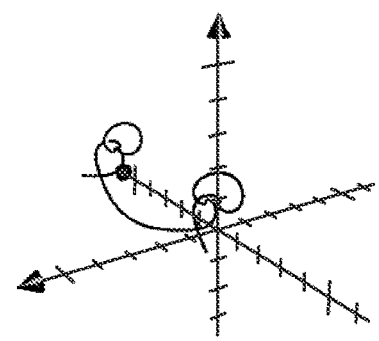
Figure 2E:
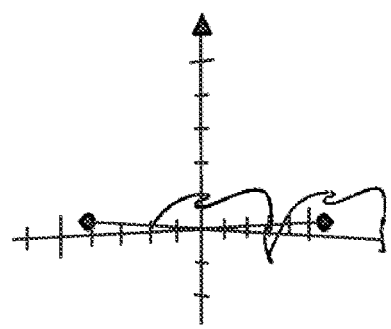
Figure 2F:
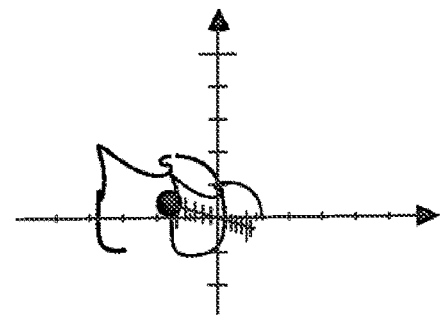
Figure 2G:
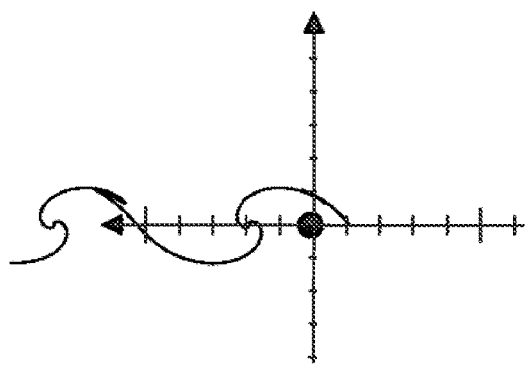
Figure 2H:
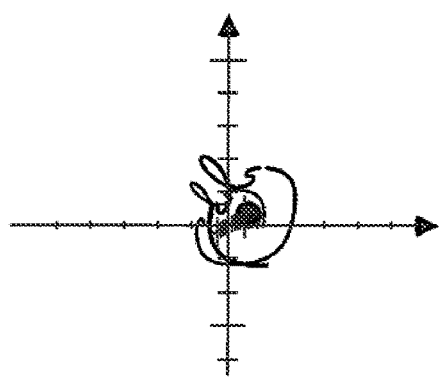

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In case of a ball, the drag crisis described above is due to early wake, and an energy efficient separation may be added to such a scenario.

Giving weight to the already described in the literature drag crisis, and considering the limitations of the drag reduction prior art, there is a need for macro-scale, easily manufactured, with applicability to both through air and through denser, i.e. marine, vehicles and vessels drag reduction structures and methods in addition to the already adopted sub millimeter riblets inspired by shark skin.

Accordingly, in one embodiment, a method is provided for reducing fluid drag, in which a body surface of an object, such as a vehicle, is provided. At least one device, or structure, is applied to the body surface, and the device is configured to produce turbulence with minimal fluid separation.

It will be understood that where bodies are discussed in this application, different sections refer to different types of bodies and body surfaces. Accordingly, certain methods discussed may be more valuable in the context of some bodies, such as vehicles, while others may be more valuable in the context of other bodies, such as turbine components. However, it will be understood that any of the methods and apparatuses may be used in the context of any of the different bodies discussed herein.

Similarly, an apparatus may be provided for reducing drag, the apparatus comprising a body having a body surface. The body may be a body for a vehicle, for example. The body surface has at least one device, or structure on the body surface, the device or structure being configured to produce turbulence with minimal fluid separation.

The body may be a maritime vehicle, such as a boat, and the devices on the body surface may take the form of barchan dunes or wedges, as discussed in more detail below. Alternatively, the body may be a trailer or shipping car on a train.

Such structures, also referred to herein as devices, as described in more detail below may promote wake, while at the same time suppress separation for as long as possible, or avoid separation altogether. such structures lead to a plurality, including but not limited to twin, quadruple, etc., stable, tube-like vortices down the fluid flow even at small Reynolds number. Other numbers (besides twin and quadruple), configurations and variations of tube-like vortices are contemplated with the scope of the present disclosure.

Figure 3A:
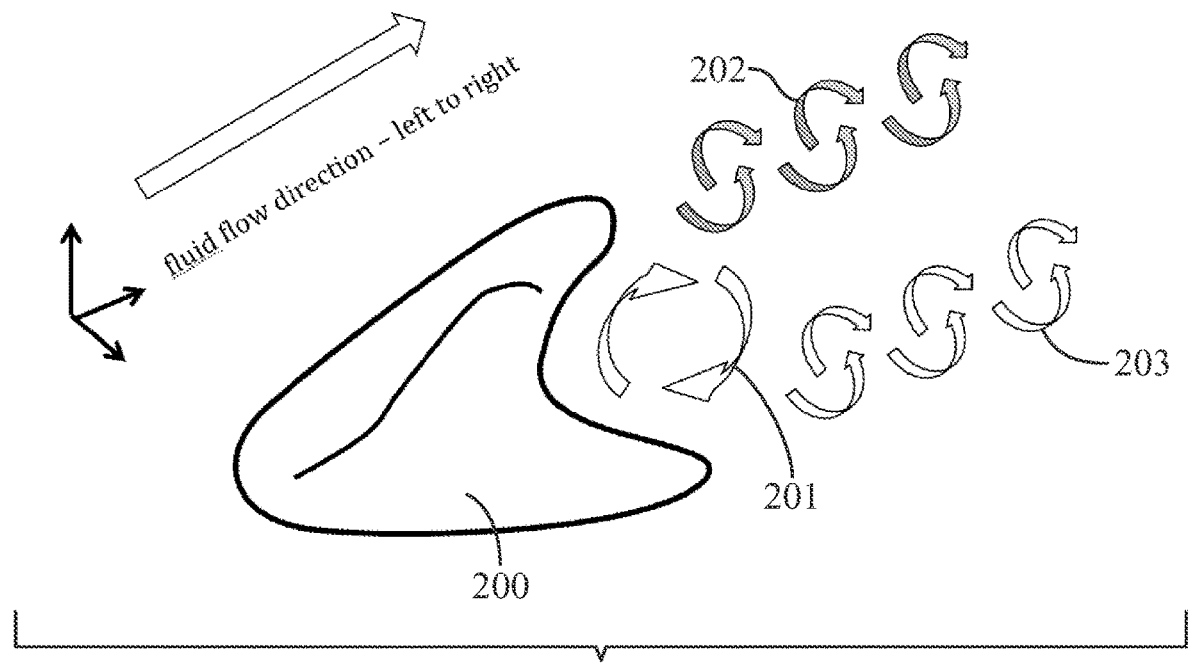
FIG. 3A depicts one embodiment of turbulent wake and turbulent vortices in case of a dune like turbulence generation device, seen from above and sideway.
Figure 3B:
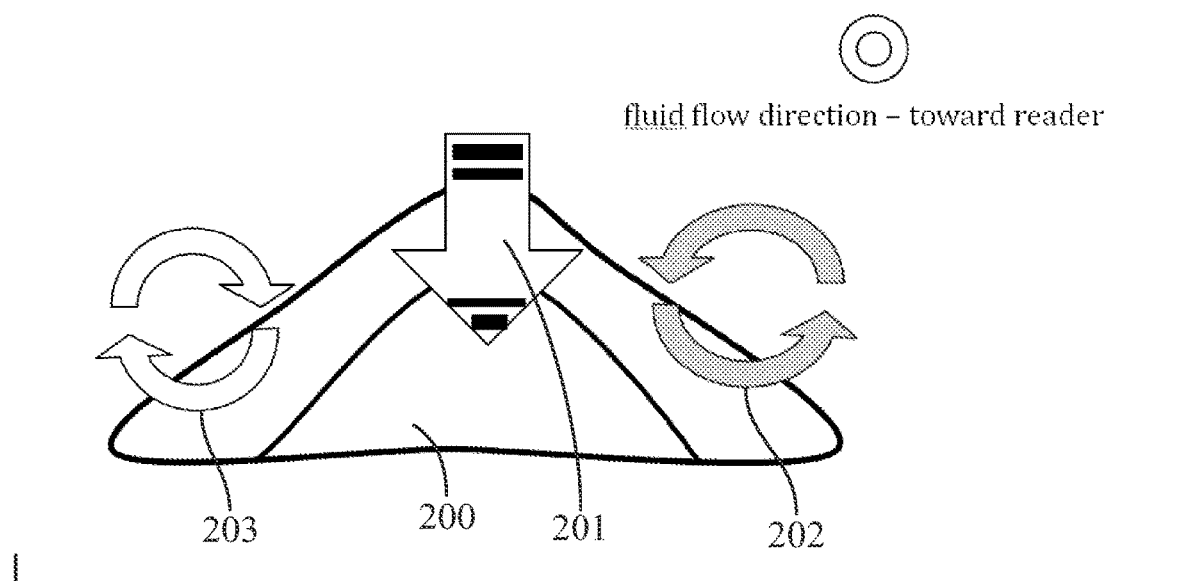
FIG. 3B depicts one embodiment of turbulent wake in case of a dune like turbulence generation device, seen behind the dune, i.e. perpendicular to the fluid flow.

In some embodiments, the structure is in the form of the barchan dune. The leeward side of the dune with the two typical elongations, i.e. horns, does promote turbulence, half-similar to the one observed in the ball drag crisis as depicted on FIG. 3A and FIG. 3B. The element 200, with the help of the modulating the flow separation bubble 201, produces the turbulence in the form of counter rotating 202, 203 tubes. The turbulence generated by such an element 200 is of a type that does not promote separation and typically the laminar flow reattaches itself to the surface at about 10-14 times the height of the dune. Devices, or structures, formed in the shape of barchan dunes and generating the described turbulence type, can alone or in configuration with other devices keep the boundary layer energized, the layer velocity profile close to the surface and play the role of a drag inhibitor. In simulations and wind tunnel experiments, the twin counter-rotating just touching vortices, occasionally referred to herein as tubes, are clearly visible. The flow above the tubes, depending on the device inducing them is between 12%-20% faster than a flow at similar height on top of a flat surface.

In addition to the bigger flow, the tubes and accelerated fluid above them, configurations of two or more devices perpendicular to the flow demonstrate additional flow stabilization by reducing the effective Reynolds number. The tubes extending behind two nearby located elements, do form a boundary, reducing characteristic dimension and the Reynolds number itself. In some embodiments where the body is an airplane wing, Reynolds number reduction of up to two orders of magnitude is achievable by placing ~100 devices.

Before discussing specific device configurations, we note that the barchan appears to be an optimal device, but not in any way the only device. Underdeveloped, with no bubble barchans, i.e. hills, can lead to similar turbulence pattern and as such play a role of drag inhibitors. Other, simpler forms, as seen in the higher Reynolds numbers ball example, can also be used as devices generating stable flow, with no separation turbulent flow patterns. Some of the examples are: various wedge forms, semi-cylinder, semi-sphere, various pyramids, cubes, semi-cones etc.

Two device shape families are presented. The barchan dune can be described mathematically by separately modeling "the hill" and the bubble structure. As discussed in the existing literature, experimentally, the vertical windward longitudinal profile of "the hill" can be modelled by $z(x) \approx He \cos \alpha(x/L\alpha)$, where $L\alpha = Le/\arccos(2-1/\alpha)$, with $\alpha \approx 3.0$ for dunes and $\alpha \approx 1.8$ for heaps. Here, He and Le are the height and the length of "the hill" correspondingly (Kroy K, et al. 2005. The shape of barchan dunes. Journal of Physics: Condensed Matter. Volume 17, Number 14). In 3D, as evident on aerial and space photos, the longitude profile should be expanded in y(x) with asymmetry making for a thicker leeward in relation to the windward side. The options modeling the asymmetry are multiple. We have decided on our empirically derived expression.

$$z(x, y) \approx He \, \cos\alpha\left(\sqrt{\frac{\left(\frac{x}{\text{factor}} * (\log(x)+1)\right)^2}{a^2} + \frac{y^2}{b^2}} \Big/ L\alpha\right)$$

for all positive values of x, while the negative values remain modelled by:

$$z(x, y) \approx He \, \cos\alpha\left(\sqrt{\frac{x^2}{a^2} + \frac{y^2}{b^2}} \Big/ L\alpha\right)$$

The bubble may be modelled by an ellipsoid.

As depicted in FIGS. 4A-4I, by adjusting the parameters and bubble form, several forms for potential device elements may be generated. In some embodiments, the parameters are provided in the following ranges:

$He \in [6,9]; a \in [15,20]; b \in [6,10]; \alpha \approx 3.0; \text{factor} \in [1.5, 1.9]$ While the barchan dune family provides substantial benefits in terms of drag reduction, particularly in such dunes taking the form shown in FIG. 4F, the shape is non-trivial and not so easy to manufacture at low cost. Hence, different device element family has been sought. One particular family is the wedge family. Wedges are easy to describe and mass produce. In OpenSCAD we write

```
module wedge(
    length, // the wedge length on the x axis, basis for all other dimensions
    alpha, // the wedge width expressed as a viewangle from 0, 0, 0; degrees
    beta, // the wedge slope as angle; degrees
    tent, // the wedge width at the summit as a view angle from the wedge leading edge; degrees
    skew, // the wedge weeward edge angle with the vertical; degrees
    flip= false // boolean determining whether to flip the wedge across x axis ) {
        height = length * tan( beta );
      tentScale = abs(tan( tent ) / tan ( alpha / 2)) / 2.0;
      linear_extrude(
        height= height,
        scale= [0.00001,tentScale],
        slices= 1000,
        twist= 0,
        $fn = 100 )
    {
        halfWidth = length * tan( alpha / 2 );
        polygon(
          points=[
            [0,0],
            [length, halfWidth],
            [length, -halfWidth]
          ]);
      }
    }
};
```

In some embodiments, in order to properly "modulate" the tubes, so to suppress parasite forms of turbulence, the wedge family is adjusted by adding curvature to the wedge edges. Results are shown on FIGS. 5A-5I. As seen, a variety of shapes exist and can be used by the invention embodiments. Hence, in some embodiments, the structure is not constrained to a particular shape or family of shapes. However, in some embodiments, the structure takes the form of a wedge having a curved upper surface, as shown in FIGS. 5A-5I. such an edge may take the form:

$$y(x) = x^{0.35} \frac{0.5 \log(\tan(1.5506x + 0.00999967)) + 1}{2}$$

In such a form, the parameters may be chosen empirically, such that the modulation passes as close as possible to the points (0, 0) and (1, 1). Other modulation, as well as parameter values can be used in contemplated embodiments to account for particular type of fluid mixing and augmented turbulence needed by the embodiment. For instance, sigmoid, hyperbolic tangent, logarithm, trigonometric, exponential, polynoms of various order, non-analytical functions with self-similarity and combination of these are all possible modulating functions.

In some embodiments, the orientation of the devices, as just seen with strongly asymmetrical forms, relative to the flow is significant. Placing the wedge with the vertical edge as leading, i.e. edge into the flow, is suboptimal though and does not generate the pure counter-rotating vortex turbulence type. On the other hand, placing the wedge as a ramp with the vertical edge down the flow does produce turbulence similar in type to the one observed during drag crisis with all the benefits arising from that.

In both the barchan dune and wedge cases, the size of the device may be adjusted as appropriate for the particular implementation. For example, a large maritime vehicle, such as a boat stretching 100 meters or longer, may be provided with devices that are 3-4 meters long. Alternatively, an engine component, such as applications in turbines discussed below, may be provided with much smaller devices.

The drag reduction effect of a single device is amplified by a set of devices positioned strategically on the body which drag is being reduced. Two non-limiting configuration patterns are described.

Figure 6:
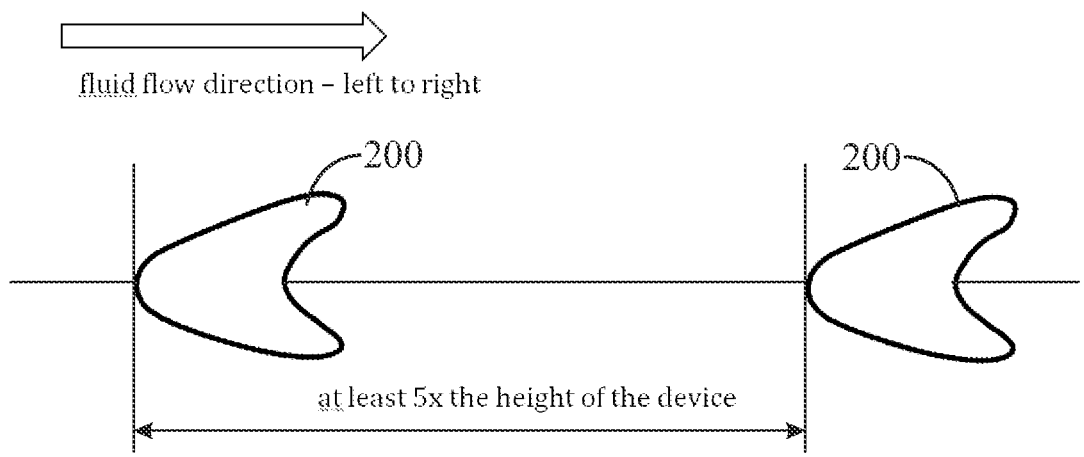
FIG. 6 depicts one embodiment of placing multiple turbulent wake devices in the direction of the flow.

FIG. 6 depicts a first configuration pattern. As shown, a body surface (the background of the image) is provided, and at least one device 200 is applied to the body surface. The device takes the shape of a barchan dune. As shown, a second device 200 may be applied along the fluid flow line 300. In the embodiments shown, the barchan dune structure represents the device. It is understood that the device may take a wide variety of forms.

In the first embodiment, shown in FIG. 6, devices are typically positioned one after another, on the fluid flow line, at distance no less than 5 times the height of the device. The lower limit of 5 times typically exists to reduce the possibility for turbulence flow with complex flow patterns, promoting separation that suppresses the effect of the drag reduction inhibitor. While there is no upper limit for the distance between the devices in this configuration, ideally, one would like to cover alongside the body surface with a plurality of vortices, such as twin vortices for example. Considerations determining the right distance include laminar flow reattachment distance, body shape and its effect on the flow, leading vs aft area, last but not least the cost of manufacturing the devices and attachment and the targeted by the application amount of drag reduction.

While the devices as shown are applied one behind another on the fluid flow lines, such devices may also be applied perpendicular to the flow lines.

Figure 7:
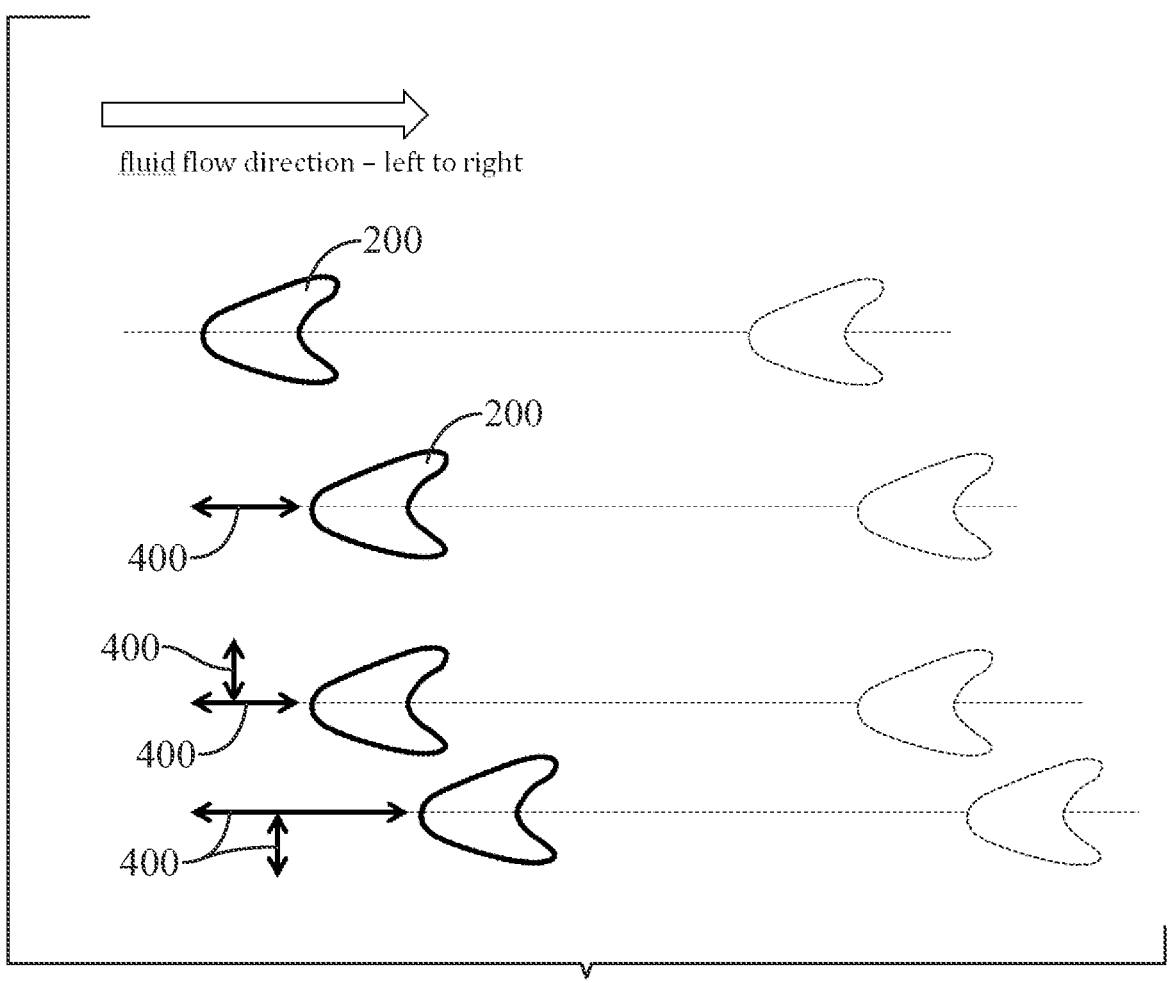
FIG. 7 depicts one embodiment of placing multiple turbulent wake devices in the direction perpendicular to the flow, thus covering bigger body surface area and as result leading to further drag reduction.

In the second configuration, shown in FIG. 7, the goal is to cover as much body surface as reasonable with such devices 200, so to maximize the drag reduction effect. Leading devices can be arranged at random locations with configurations normal and tangential to the predominant flow offsets. At the leading edge, the distance at which the devices are placed on the flow lines may also be altered, looking to maximize the drag reduction effect, while minimizing the manufacturing and maintenance costs.

The body described may be an aircraft, helicopter, aircraft engine, glider or planer, or rocket in which case the fluid would comprise air. Accordingly, the devices described may be applied to a body surface of any such body. Similarly, the body described may be, and the devices described may be applied to a body surface of a marine vessel, ship, submarine, torpedo, or platform, including single or multi-hull boats or surf boards, in which case the fluid is water. Similarly, the devices described may be applied to a body surface of an auto vehicle or a trailer, trucks included, in which case the fluid comprises air. Other vehicles are contemplated as well, including train locomotives, train cars, and cistern or tank cars. Similarly, the devices described may be applied to a body surface of a pipe, in which case the fluid may be water, oil, liquid medal, chemical, or gas, among others. Other device and surface configurations are contemplated.

Figure 8A:
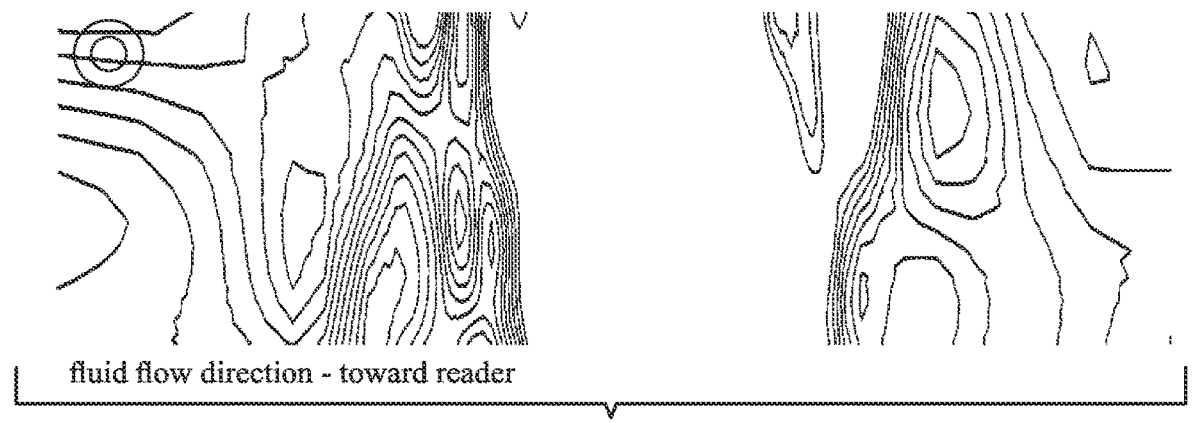
FIGS. 8A and 8B depict the observed during wedge flow simulation vertical fluid motion at the $20^{th}$ second into the simulation. To simplify the visual representation the upward fluid motion is depicted separately (A) of the downward motion (B). The slice is vertical, with a normal in the direction of the flow, and taken about 23 units from the wedge summit, with the wedge summit height being a unit. Reynolds number is ~20000.
Figure 8B:
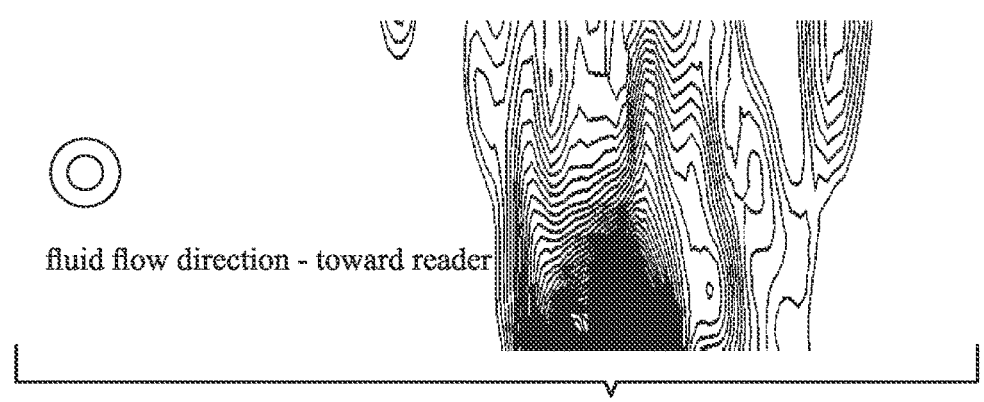
Figure 9A:
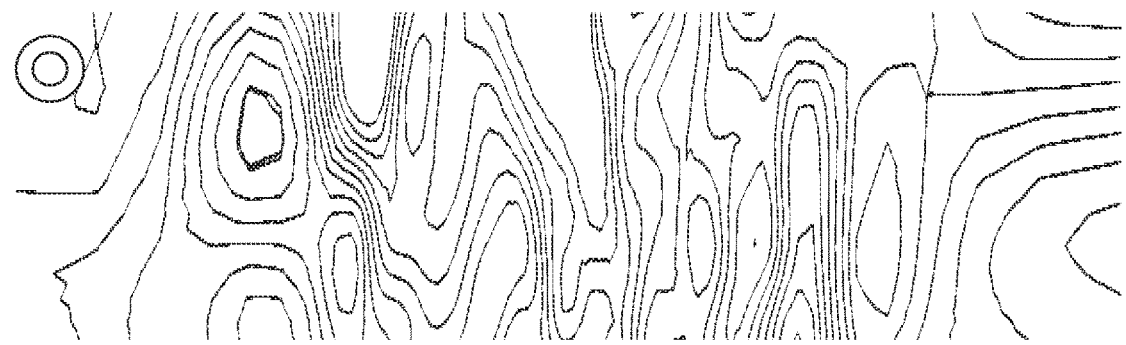
FIGS. 9A and 9B depict the observed over a flat surface vertical fluid motion at the $20^{th}$ second into the simulation. To simplify the visual representation the upward motion is depicted separately (A) of the downward motion (B). The slice is vertical, with a normal in the direction of the flow and at the same distance from the inlet as in FIG. 8. Reynolds number is ~20000.
Figure 9B:
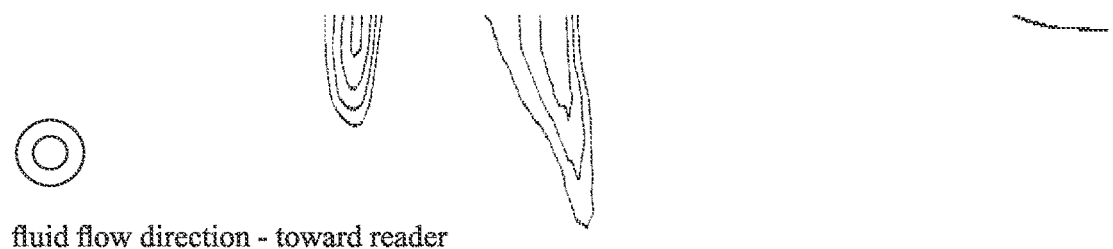

The counter-rotating vortices exhibit important property. They promote downward, toward the surface flow. This is depicted on FIGS. 8A and 8B, then contrasted with the flow of fluid on top of a flat sticky surface on FIGS. 9A and 9B. The upward and downward fluid movements have been split and presented on FIG. 8A, FIG. 9A and FIG. 8B, FIG. 9B respectively. The slices are vertical, with a normal in the direction of the flow, at the same offset from the inlet, with snapshots at $20^{th}$ second into the simulation. In the case of the wedge, the slice is about 23 units down the flow from the wedge summit, the summit height being a unit. The fluid is air and the flow is with Reynolds number of ~20000. The lines on the figures are vertical velocity component isolines. They are equally spaced in terms of vertical velocity increments. This allows for easy vertical motion visual inspection, upon which few observations are made. The flow above the counter-rotating vortices exhibits a downward motion component. This on its own has stabilization effect on the flow by inhibiting large vortex buildup and later separation from the surface. The downward component in the flat surface case is insignificant in magnitude. High in magnitude upward and downward movement exists in the area of the counter-rotating vortices.

These powerful fluid movements, depicted in near black due to the high isolines density, combined with the downward stabilization component above them, are suitable for heat exchange applications, in turbines for instance. The vortices themselves show high resilience and extend long, long distances behind the element. Accordingly, in some embodiments, a method is provided for improving heat exchange, the method comprising providing an internal or external body surface of an object, and applying at least one device, or structure, such as those discussed above, to the body surface. The device is configured to produce turbulence with minimal fluid separation, wherein the turbulence produced extends with the flow directly behind the device (or devices, where multiple devices are applied) and stays close to the surface. The close to the surface turbulence assists the heat exchange in a convectional manner.

Similarly, an apparatus may be provided for improving heat exchange. The apparatus may comprise a body of an object, such as a turbine blade, for which heat exchange is to be improved. The body has a body surface, and at least one device, or structure, such as those discussed above, is provided at the body surface. The device is configured in terms of shape and or location of the device, to produce turbulence with minimal fluid separation, and the turbulence produced extends with the flow directly behind the device and stays close to the surface. The close to the surface turbulence assists the heat exchange in a convectional manner.

Figure 10A:
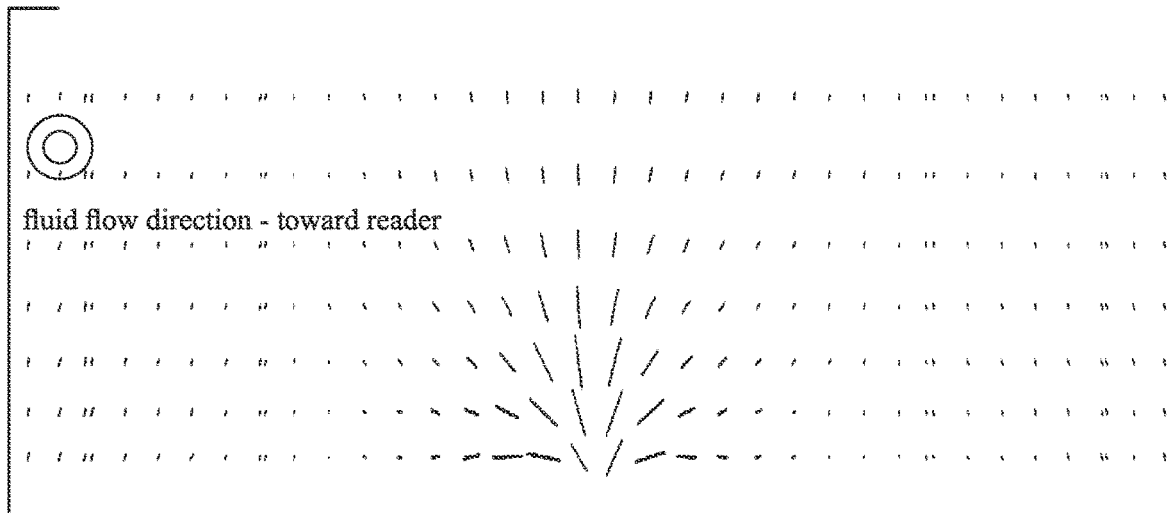
FIGS. 10A and 10B depict the velocity field of the twin counter-rotating vortices seen in the wedge flow simulation. The slice is vertical, with a normal in the direction of the flow. The slice on A is about 14 units down the flow from the wedge summit, the wedge summit height being a unit. The slice on B is down the flow at about 23 units. The simulation times presented are second 15 and 20 into the simulation respectively. The figures show the vortices region maximized and are not to scale with FIG. 8 and FIG. 9. Reynolds number is ~20000.
Figure 10B:
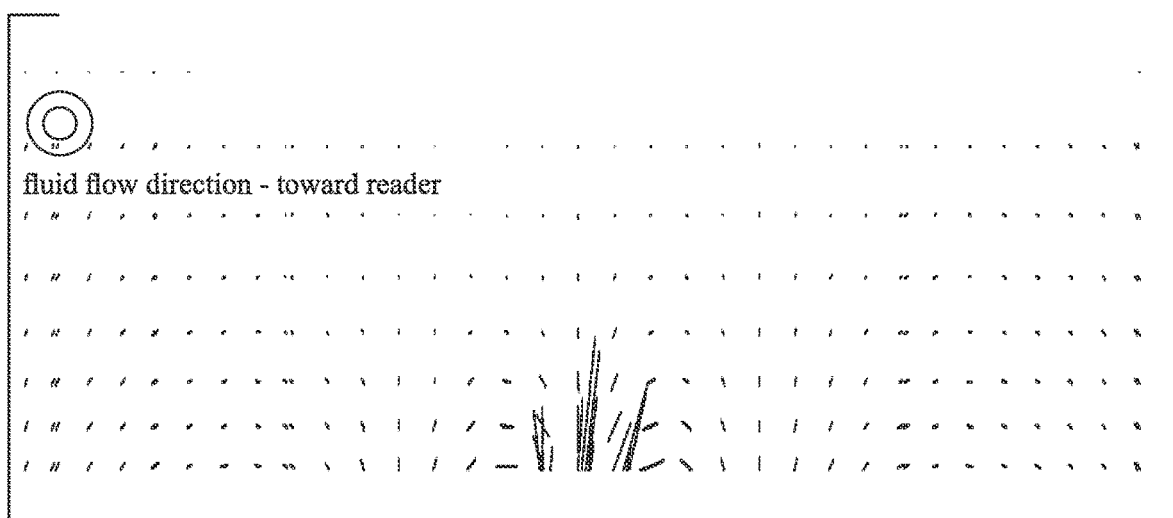

In such an embodiment, the vortices remain clearly identifiable 14, 25 height units behind the wedge as seen on FIG. 10A and FIG. 10B respectively. As such, in one embodiment, they add an accountable, very predictable in time and space convection component to modern discrete film, full blade film, full blade transpiration as well as older turbine air cooling mechanisms. In another embodiment, one or more elements on the blade do improve the blade cooling by pure convection mechanism and do not need to be coupled with other forms of cooling to work. In another embodiment, the elements are placed in the air blade cool air inlet, so to turbulize the cool air flow, leading to ~10-20% more efficient internal convection cooling, or ~10-20% more efficient internal impingement cooling. In another embodiment, the elements are placed on the internal walls and turbulize the internal convection or impingement flow. Other applications of the drag crisis inspired convectional heat exchange are presently contemplated. The embodiments described incorporate elements, or devices, applied to the surface of turbine blades that generate turbulence similar to that of drag crisis at low Reynolds numbers, such that such turbulence can appear much earlier than favorable drag crisis flow conditions.

Accordingly, the fluid may comprise air, gas, liquid gas, water, oil, liquid metal, or any other fluid, and the body surface may comprise a surface of an engine intake or exhaust, a turbine intake or exhaust, a pump intake or exhaust or a surface of a vertical turbine blade, a horizontal turbine propeller or blade, or a helicopter blade.

Another embodiment of the present invention provides a method for improving stall characteristics of airplane wing, turbine or propeller blade, as well as vessel or craft control surfaces. The method provides a body surface or a control surface for a body and applies at least one device to the body surface. The device is configured to produce turbulence with minimal fluid separation. The turbulence generated stays close to the surface and stabilizes the flow. Accordingly, the turbulence extends directly behind the device and with its low dynamic pressure promoting downward, towards the surface, fluid motion stabilizing the flow.

In some embodiments, an apparatus is provided for improving stall characteristics. The apparatus comprises a body of an object, such as a wing, turbine, or propeller blade, or a vessel or craft control surface. The body has at least one body surface, and the body surface has at least one device, or structure applied thereto. The device is configured, in terms of shape, size, and/or location, to produce turbulence with minimal fluid separation. The turbulence extends directly behind the device and has low dynamic pressure promoting downwards motion, directed towards the body surface, thereby stabilizing the flow.

Figure 11A:
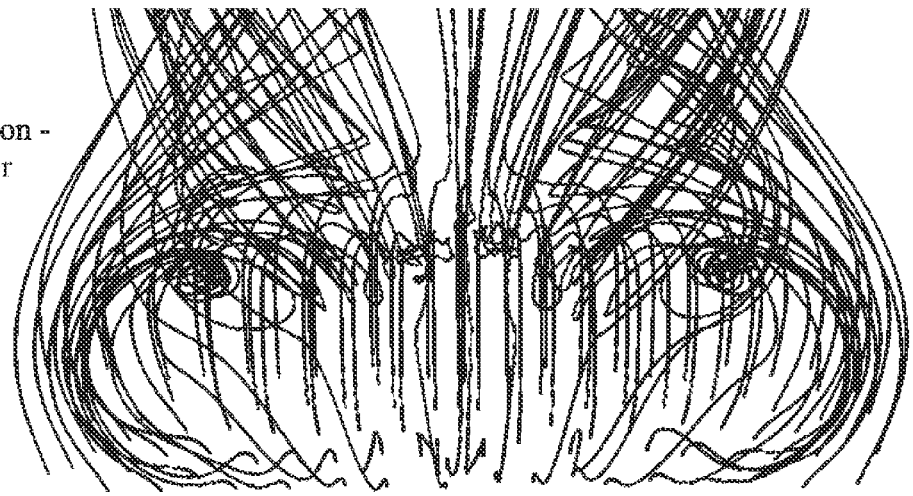
FIGS. 11A and 11B depict the streamlines around NACA 0035 profile. The streamlines around both, furrowed with barchans dunes (A) and original smooth surface profile (B) are shown. The wing is viewed from the front with flow away from the viewer. Reynolds number is ~3000000.
Figure 11B:
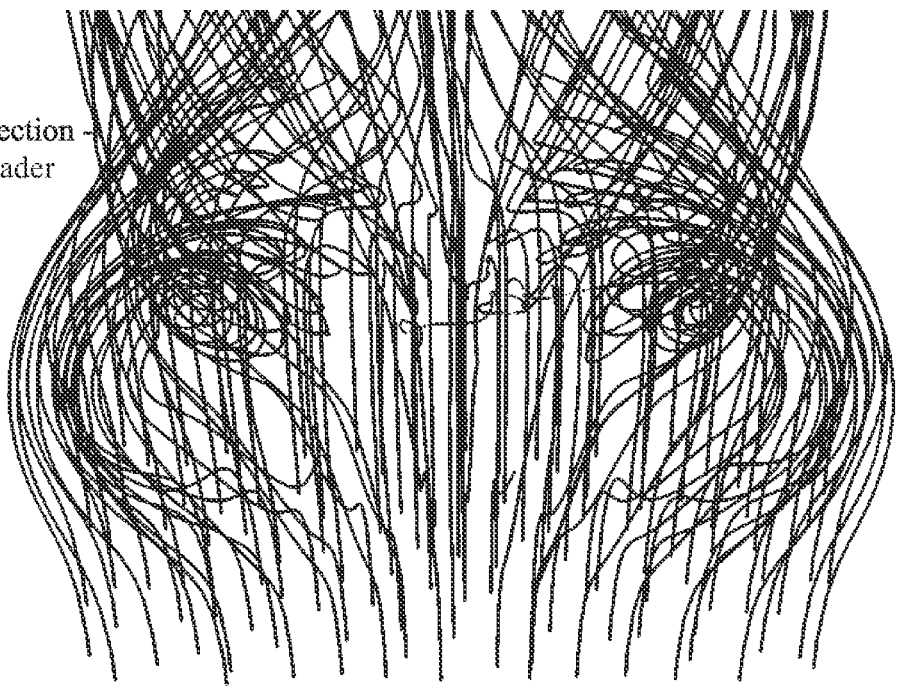
Figure 12:
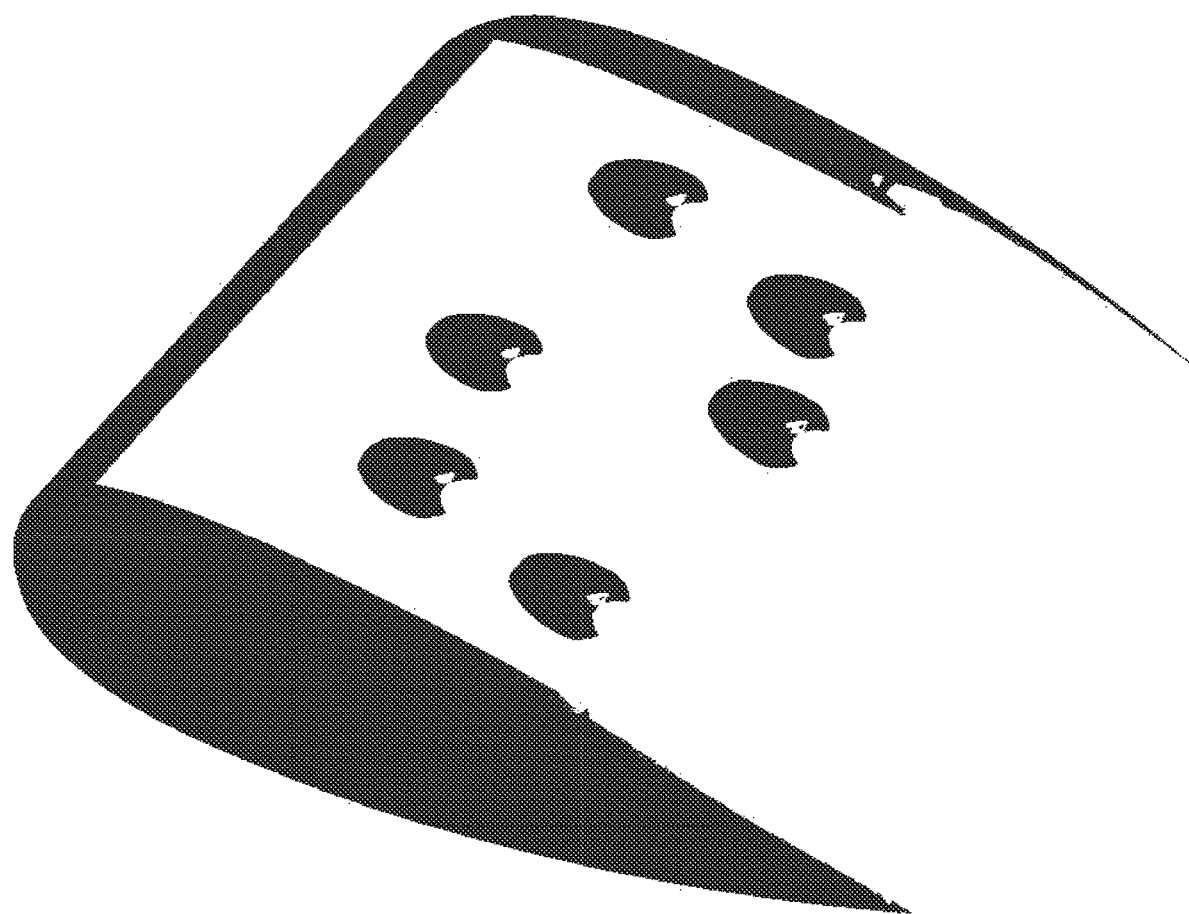
FIG. 12 depicts the NACA 0035 foil body, furrowed by dunes as used in flow simulations with Reynolds number of ~3000000.
Figure 13:
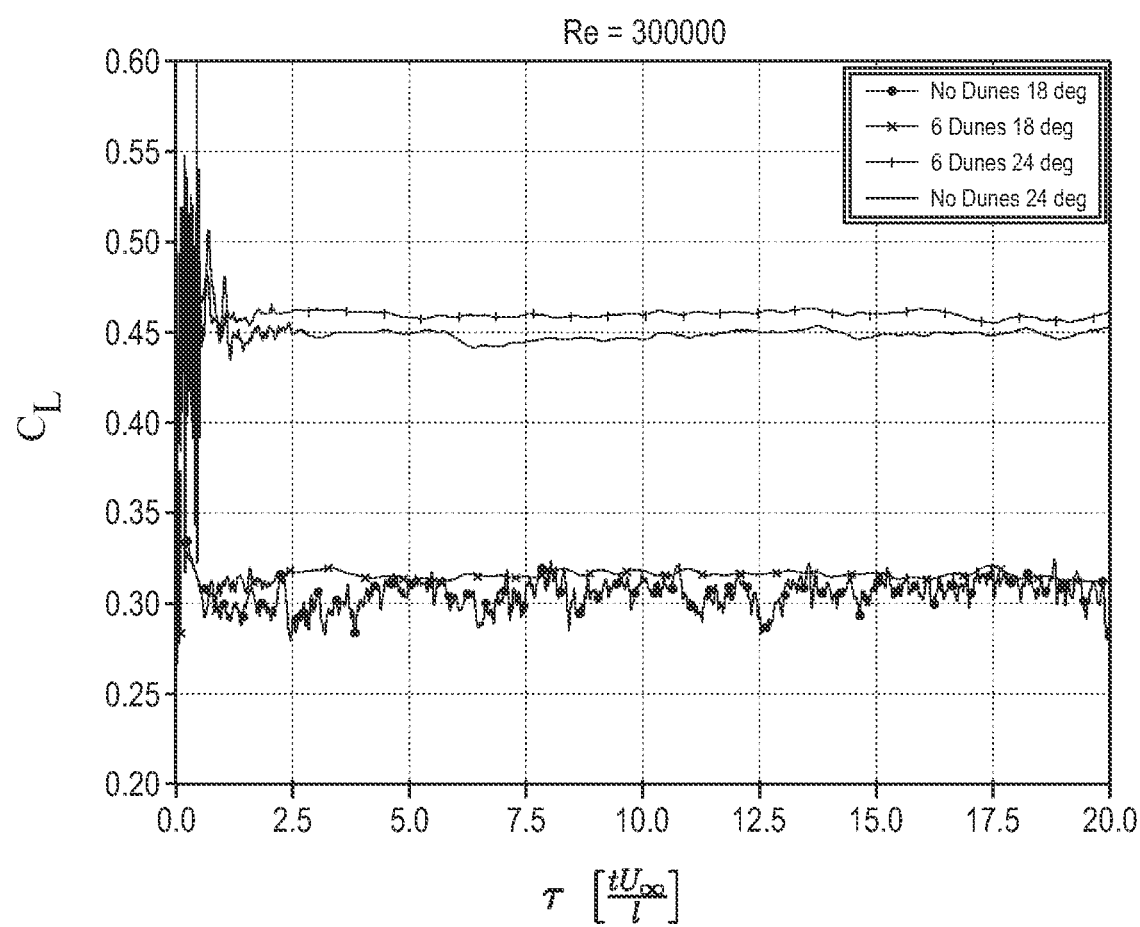
FIG. 13 depicts lift coefficient evolution in time. The profile is NACA 0035 foil in a flow with Reynold number ~3000000 at various angles of attack.
Figure 14:
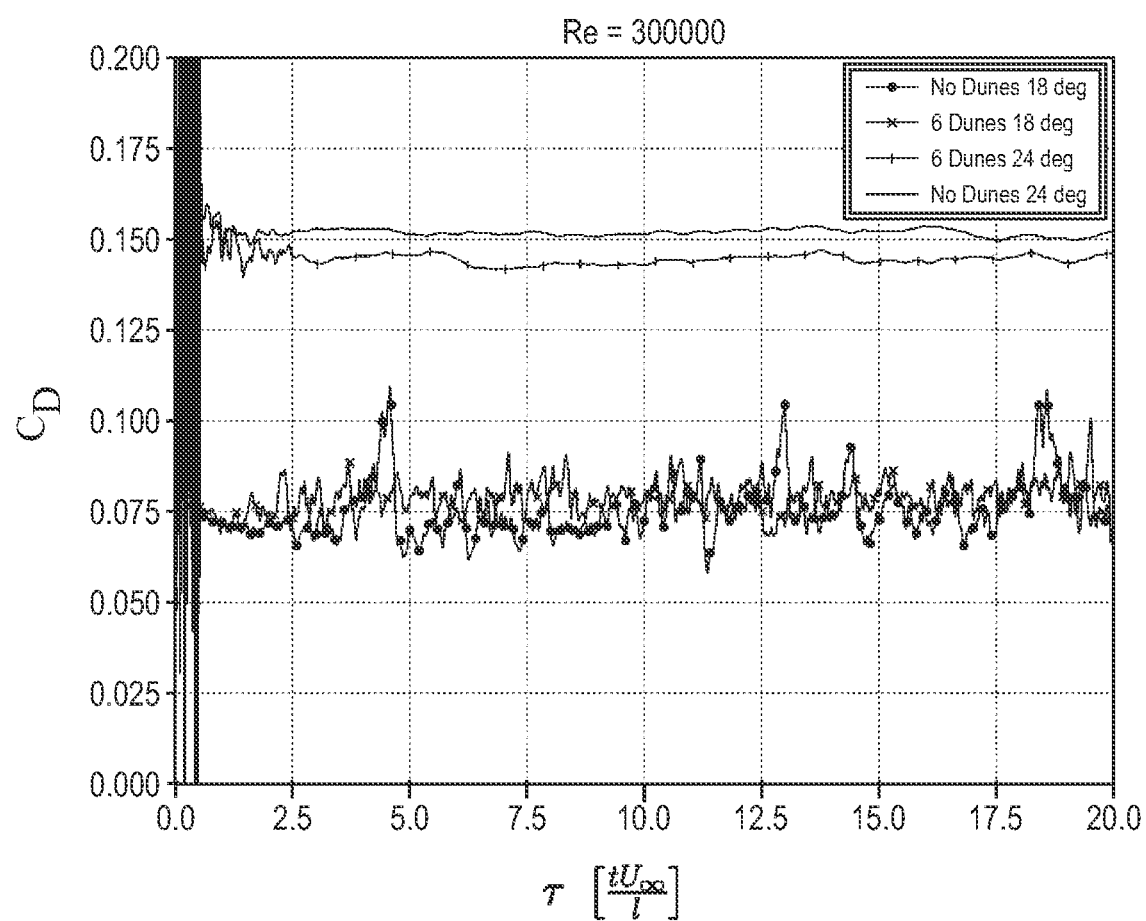
FIG. 14 depicts drag coefficient evolution in time. The profile is NACA 0035 foil in a flow with Reynold number ~3000000 at various angles of attack.

Accordingly, in other embodiments of the invention, the downward toward the surface motion is utilized to improve the stall characteristics of airplane wing, glider wing, airplane, glider, and marine vessel control surfaces (rudder, elevator, aileron, stern planes, sail planes, etc.), wind turbine, helicopter blades, propeller and turbine blades. As the angle of attack of the wing, blade or control surface increases, big vortex known as separation bubble forms on the leeward side. In experiments with 2 meter long NACA 0035 foil, we observe reduced in size separation bubble and absent back flow as 6 elements in the form of roughly 15 cm barchan dunes are places on top of the wing (furrowed wing). This better organizes the flow, with insignificant perpendicular and backward flow component as the streamlines on FIG. 11A show. Contrast the furrowed wing flow to the flow observed on FIG. 11B, resulting from a smooth, unmodified symmetrical NACA foil. The streamlines of the flat wing show additional complexity due to unstable and chaotic close to the surface flow. To better understand the aerodynamic characteristics of the bluff body furrowed by dunes on FIG. 12, as well as the most efficient operational mode in relation to the fluid transition zone, lift and drag coefficients comparison of flat surface rounded tips NACA0035 and 6 dunes rounded tips NACA 0035 are extracted separately on plotted on FIG. 13 and FIG. 14 respectively. In the computations, variable angle of attack is used, whereas Reynolds number was kept fixed at 3000000. The analyses have been performed by using different numerical approaches. It is strongly recommended experiments to be executed for results validation.

Figure 17:
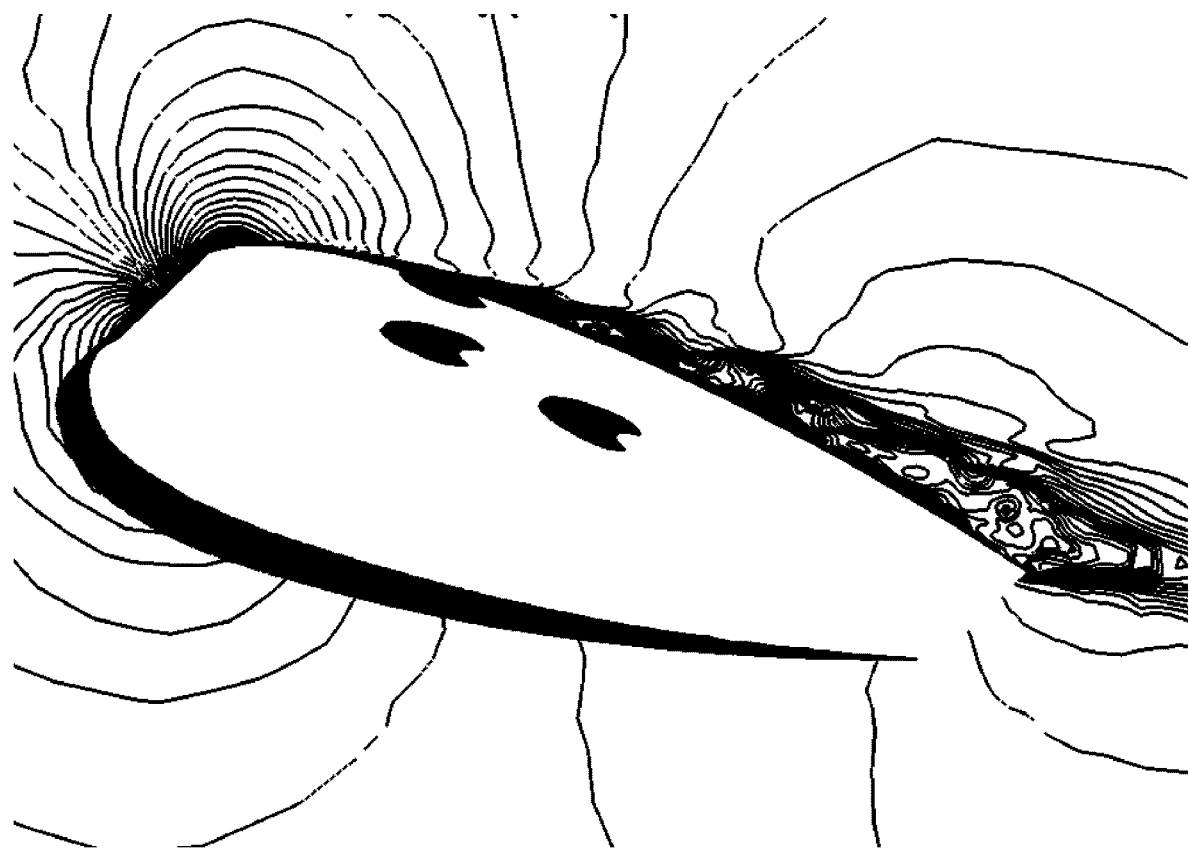
FIG. 17 depicts the fluid speed isolines around the furrowed by dunes NACA 0035 in a flow with Reynolds number ~3000000 at 24 degrees angle of attack.
Figure 18:
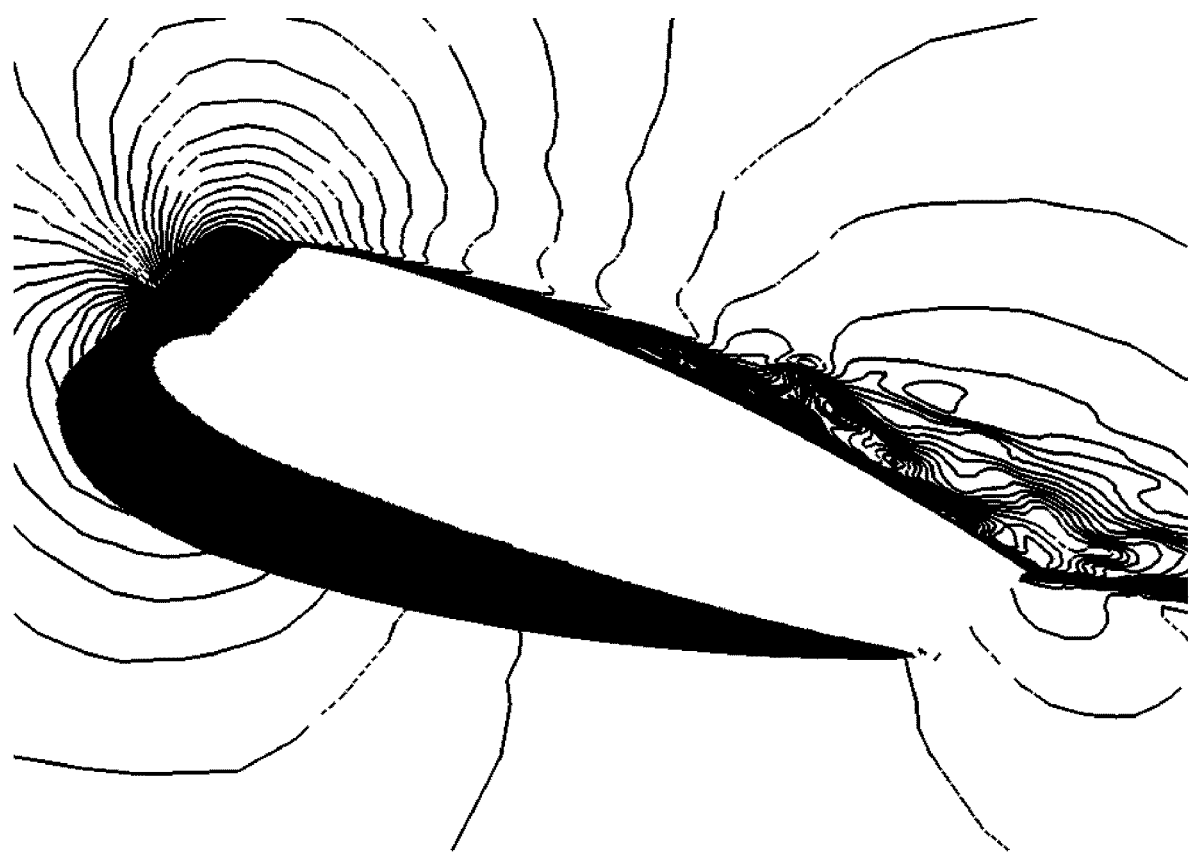
FIG. 18 depicts the fluid speed isolines around the flat surfaced, unmodified, except for the edge rounding, NACA 0035 in a flow with Reynolds number ~3000000 at 24 degrees angle of attack.

We could say that the made analyses are relatively conservative. The RANS (Reynolds Averaged-Navier-Stockes) equations FVM (Finite Volume Method) mesh based approach, where high non-linear effects are implemented in computation by using of sub-grid turbulence models, gives in some cases significant divergence with experiment data due to mesh size constraints. Loss of lift force exists, according to data presented in FIG. 15 when the angle of attack increases. The mean drag coefficient is lower at 24 degrees by furrowed wing compared to clean wing, FIG. 16, as it is believed that the laminar flow over the toward half of the wing is extended so the transition point is moved toward. Furthermore, the size of the separation bubble appears to be reduced as, FIG. 17, showing a furrowed wing vs FIG. 18 showing a smooth wing suggest, which contributes to drag reduction seen on FIG. 16. In conclusion, placing elements on the wing in the flow transition zone, even in suboptimal configuration does stabilize the flow and delay the wing and control surface stall. Further, symmetrical in terms of furrowing both wing surface have been contemplated, in addition to embodiments where devices on the leading windward surface with the help of tubes reduce the frontal dynamic pressure, gather back the fluid inhibiting its separation and push the transition zone towards.

In another embodiment, the downward fluid motion and the already discussed delayed stall is used in wind turbines, so they overcome the stall experienced as the wind regime or the blade angle of attack changes, thus improving the turbine wind operational range. The delayed stall allows for additional load to be put on the generator with reduced risk of bringing the turbine to a grinding halt under this bigger load. The delayed stall has a structural stabilization effect on, for example, the vertical Darrieus type turbines, known to exhibit structural instabilities arising from uneven load as the blades rotate in the wind.

In another embodiment, combination of one or more elements in the form of wedges, barchans dunes, hill like bumps, or ridges are placed on the bottom of a surf board. In windsurfing, as the board switches from non-planing, boat like displacement regime, to a planing, jet-ski regime, enormous load is put on the sailor as she has to channel the wind power required for the board to "pop up" all the way from the sail to the board and most importantly fin. The elements on the bottom of the surfing board alleviate this, by reducing the drag, placing the board optimally in the water and reducing displacement, from there reducing the load on the sailor, and ultimately leading to early and easy board planing. In our experiments with F2 Vegas twin fin boards (https://www.f2.com/surf/boards.php?da=1829), a stable, easy to ride, early planing board was produced. The devices covered efficiently 0-22 knots per hours speed range, in a complex, three to four way boundary involving water, air, aerated water and board surfaces.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

DRAWINGS—REFERENCE NUMERAL

100—a ball
101—early turbulence wake in big Reynolds numbers regime
102—vortex tubes forming behind the ball, main contributors to the drastic drag reduction in big Reynolds numbers, i.e. drag crisis
200—turbulence wake device, with dune-like 3D shape in this particular case
201—modulating vortex in the dune bubble
202—vortex tube forming behind the dune, main contributors to the drag reduction
203—counter rotating vortex tube forming behind the dune, main contributors to the drag reduction
300—down the flow placement of the next turbulent wake device
400—random, normal and tangential to the flow offsets when covering the 2D body surface for the purpose of fluid drag reduction.

What is claimed is:

1. A method for reducing fluid drag, or generating improved stall characteristics and agility, or improved heat exchange, the method comprising:
    providing a body surface or control surface;
    applying at least one device to the body surface;
    wherein the device is configured to produce turbulence with minimal fluid separation;
    wherein the close to the surface turbulence assists the heat exchange in a convectional manner;
    wherein the turbulence extends directly behind the device and with its low dynamic pressure promoting downward, toward the surface fluid motion stabilizing the flow;
    wherein the turbulence produced is in the form of a plurality of counter rotating, just touching vortices appearing as tubes down the fluid flow;
    wherein the turbulence produced is in the form of two counter rotating, just touching vortices appearing as tubes down the fluid flow, in the form of quadruple, two by two counter rotating vortices appearing as tubes down the fluid flow or plurality of counter rotating vortice pairs; and
    wherein the device includes a structure in a form of a barchan dune, and the structure includes two elongations at a leeward side of the dune.

2. The method of claim 1, wherein the device comprises a plurality of devices arranged one behind another on the fluid flow lines, wherein the applying of the at least one device comprises the applying of a first of the plurality of devices at a first location on the body surface and applying a second of the plurality of devices at a second location spaced apart from the first location by a length greater than five times a height of the first device relative to the body surface.

3. The method of claim 1, wherein the device comprises a plurality of devices, and wherein the application of the devices further comprises arranging the devices perpendicularly to the flow lines.

4. The method of claim 1, wherein the device comprises a plurality of devices, and wherein the application of the devices further comprises arranging the devices randomly normally and tangentially to the flow offsets and to one another.

5. The method of claim 1, wherein the fluid comprises air and the body surface comprises a surface of a vehicle, trailer, container, train locomotive, train car or cistern or tank car or a surface, including control surface of an aircraft, helicopter, aircraft engine, or glider.

6. The method of claim 1, wherein the fluid comprises water and the body surface comprises a surface, including control surfaces, of a marine vessel, ship, submarine, torpedo, platform, single or multihull boat, or surf board.

7. The method of claim 1, wherein the fluid comprises air, gas, liquid gas, water, oil, liquid metal or other fluid, and the body surface comprises an engine intake or exhaust, a turbine intake or exhaust, a pump intake or exhaust or a pipe in which the fluid flows.

8. The method of claim 1, wherein the fluid comprises air, gas, liquid gas, water, oil, liquid metal or other fluid and the body surface comprises a surface of a vertical turbine blade, horizontal turbine propeller or blade, helicopter blade.

9. An apparatus for reducing drag, or improved stall characteristics, or improved heat exchange comprising:
    a body having at least one body surface; and
    at least one device on the body surface;
    wherein the device is configured to produce turbulence with minimal fluid separation;
    wherein the turbulence produced extends with the flow directly behind the device and stays close to the surface;
    wherein the close to the surface turbulence assists the heat exchange in a convectional manner;
    wherein the turbulence extends directly behind the device and with its low dynamic pressure promoting downward, toward the surface fluid motion stabilizing the flow;
    wherein the turbulence produced is in the form of a plurality of counter rotating, just touching vortices appearing as tubes down the fluid flow;

wherein the turbulence produced is in the form of two counter rotating, just touching vortices appearing as tubes down the fluid flow, or in the form of quadruple, two by two counter rotating vortices appearing as tubes down the fluid flow, or in the form of plurality of counter rotaiting vortice pairs; and wherein the device includes a structure in a form of a barchan dune, and the structure includes two elongations at a leeward side of the dune.

10. The apparatus of claim 9, wherein the device comprises a plurality of devices arranged one behind another on the fluid flow lines, wherein the plurality of devices are spaced apart by a length greater than five times a height of the device relative to the body surface.

11. The apparatus of claim 9, wherein the device comprises a plurality of devices, and wherein the devices are on the body surface perpendicularly to the flow lines.

12. The apparatus of claim 9, wherein the device comprises a plurality of devices, and wherein the devices are located randomly on the body surface normally and tangentially to the flow offsets and to one another.

13. The apparatus of claim 9, wherein the fluid comprises air and the body surface comprises a surface of a vehicle, trailer, container, train locomotive, train car or cistern or tank car or a surface, including control surfaces, of an aircraft, helicopter, aircraft engine, or glider.

14. The apparatus of claim 9, wherein the fluid comprises water and the body surface comprises a surface, including control surfaces, of a marine vessel, ship, submarine, torpedo, platform, single or multihull boat, or surf board.

15. The apparatus of claim 9, wherein the fluid comprises air, gas, liquid gas, water, oil, liquid metal or other fluid, and the body surface comprises an engine intake or exhaust, a turbine intake or exhaust, a pump intake or exhaust, or a pipe in which the fluid flows.

16. The apparatus of claim 9, wherein the fluid comprises air, gas, liquid gas, water, oil, liquid metal or other fluid and the body surface comprises a surface of a vertical turbine blade, a horizontal turbine propeller or blade.

\* \* \* \* \*